United States Patent [19]

Erbach

[11] Patent Number: 4,458,585
[45] Date of Patent: Jul. 10, 1984

[54] RACK FOR BARBECUE GRILL
[75] Inventor: Arthur R. Erbach, Des Plaines, Ill.
[73] Assignee: Weber-Stephen Products Co., Palatine, Ill.
[21] Appl. No.: 504,172
[22] Filed: Jun. 14, 1983
[51] Int. Cl.³ ............................................. A47J 43/18
[52] U.S. Cl. ...................................... 99/419; 99/426; 99/448; 211/181
[58] Field of Search ...................... 99/419, 426, 421 V, 99/448; 211/64, 59.1, 54.1, 181; 248/302, 303, 317, 309.2

[56] References Cited
U.S. PATENT DOCUMENTS

D. 100,443  7/1936  Sherrick ........................ 211/181 X
849,676  4/1907  Gordon ........................... 211/181 X
1,717,133  6/1929  Welsh ............................. 211/181 X
2,634,674  4/1953  Irwin ................................. 99/419

Primary Examiner—Billy J. Wilhite
Assistant Examiner—Christine A. Peterson
Attorney, Agent, or Firm—Robert E. Wagner; Ralph R. Rath

[57] ABSTRACT

A rack for use with a grill having a cooking surface defined by spaced rods is formed by bending two wires that define a base and an upright article-receiving support extending above the base. The base has spaced, generally L-shaped projections that are inserted between two spaced rods and under one rod to secure the rod on the cooking surface.

11 Claims, 4 Drawing Figures

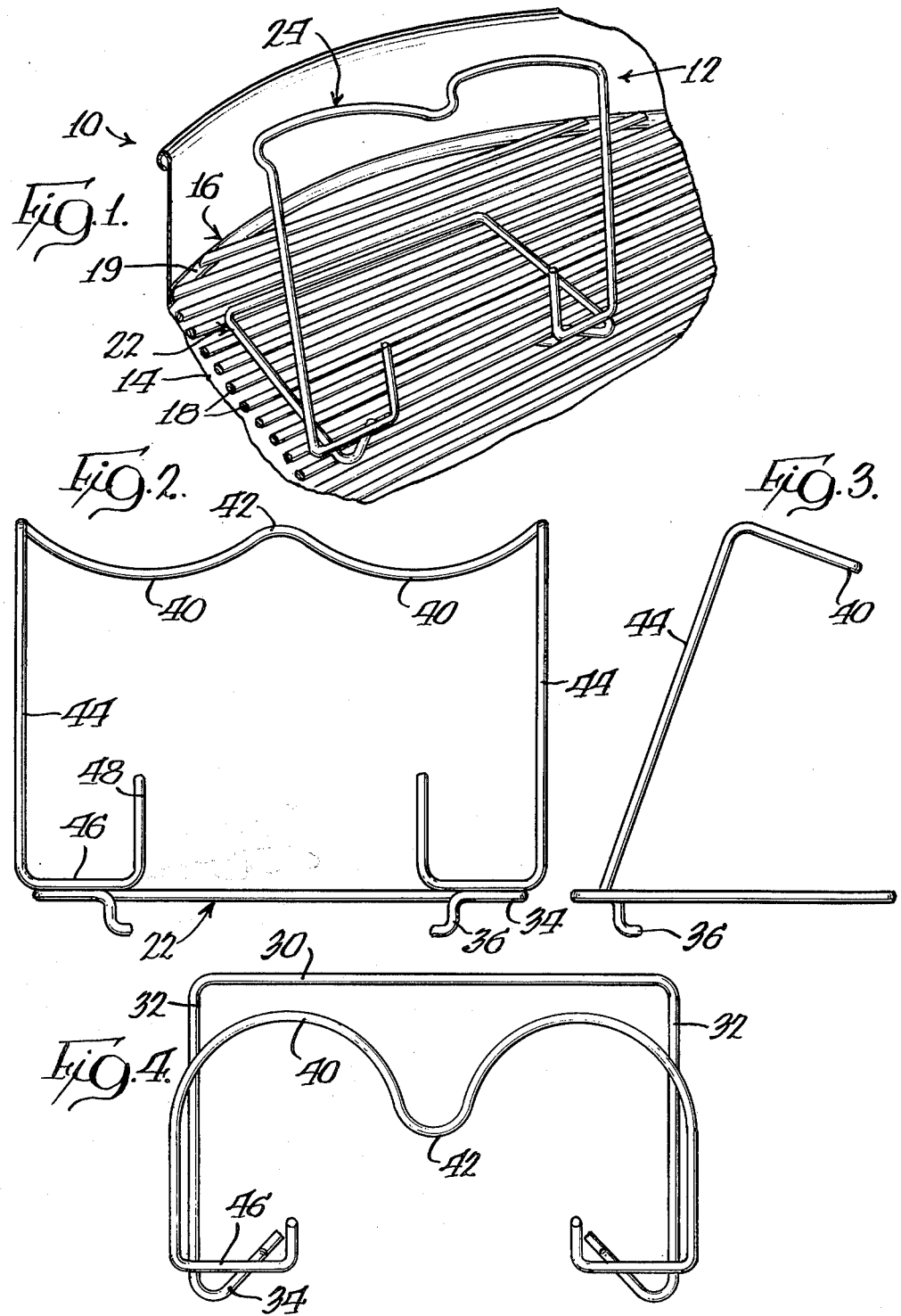

RACK FOR BARBECUE GRILL

DESCRIPTION

1. Technical Field

The present invention relates generally to outdoor cooking devices and, more specifically, to a rack for holding articles in an upright position on a grill.

2. Background Prior Art

Outdoor cooking devices have been in existence for many, many years and can be found in virtually all residences. As a result, various accessories have been developed for use in connection with the conventional barbecue grill that includes a cooking surface which is defined by a plurality of spaced rods secured to a removable support structure. Examples of such accessories are racks to be used for holding ribs during the cooking process, roast holders, condiment holders, as well as racks for holding a plurality of elongated articles, such as ears of corn.

For several years, the Assignee of the present invention has marketed a generally circular rack that is specifically designed for fitting into the circular grill that is also marketed by the Assignee of the present invention so that the articles, such as ears of corn or potatoes, are supported around the periphery of the cooking surface and can be cooked simultaneously with the main course that is located in the center of the cooking surface. While such a rack has been accepted by owners of kettles, there are certain inherent disadvantages associated with the large circular rack. Such large circular rack requires a large amount of packaging for shipment and display, as well as occupying a considerable amount of space during storage and/or display. Furthermore, the Assignee of the present invention markets several sizes of charcoal kettles and, to be most effectived, the circular rack should be adapted to occupy the outer periperhy of the cooking surface and therefore should be marketed in different sizes corresponding to the size of the kettle. This would require further additional inventory and shelf space during display.

Thus, it would be desirable to have a support rack that occupies less space and is more versatile in use.

SUMMARY OF THE INVENTION

According to the present invention, a simplified small rack has been developed which is specifically designed for use in cooking of elongated articles, such as ears of corn. The rack is formed from two wire members that are bent to specific configurations and respectively define a base and an upwardly-extending support member.

More specifically, the base consists of a single wire that is bent to a generally U-shaped configuration having a bight portion and two generally parallel spaced legs extending from the bight portion. Generally L-shaped integral ends are formed on the respective ends of the respective legs and are adapted to be inserted between an adjacent pair of rods defining a cooking surface and under one of the rods to support the base on the cooking surface.

The support member or structure also consists of a single wire that is bent to a generally inverted U-shaped configuration having a bight portion defining at least one generally arcuate recess spaced above the base and two generally parallel legs extending towards the base with inwardly-directed extensions integral with the ends of the legs and secured to the base. Upwardly-extending piercing projections are integral with the free ends of the inwardly-directed extensions.

In the specific embodiment illustrated, the rack is designed to support a pair of articles and, thus, has two arcuate portions defined in the bight portion of the wire to define two article-receiving cradles spaced from the base.

BRIEF DESCRIPTION OF SEVERAL VIEWS OF DRAWINGS

FIG. 1 is a fragmentary perspective view of a cooking grill having the present invention supported thereon;

FIG. 2 is a front elevational view of the rack;

FIG. 3 is a side elevational view of the rack; and,

FIG. 4 is a top plan view of the rack.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings discloses a barbecue grill or kettle, generally designated by reference numeral 10, having a rack 12 constructed in accordance with the teachings of the present invention supported thereon. Grill 10 is preferably of the type sold by the Assignee of the present invention and consists of a bowl 14 with a removable grill structure 16 defining a cooking surface therein. The cooking surface is usually defined by a plurality of spaced rods 18 secured to a peripheral support rod 19.

According to the present invention, the rack 12 is formed from a pair of wires that are bent to a specific configuration to securely support the articles to be cooked above the cooking surface and out of direct contact with the cooking surface. As illustrated in FIG. 2, the rack 12 consists of a first wire 22 bent to a specific configuration to define a base and a second wire 24 bent to define a support structure that extends above the base 22.

As shown in the drawings, the base structure or base wire 22 is bent to a generally U-shaped configuration having a bight portion 30 and a pair of legs 32 integral with and extending from opposite ends of bight portion 30. The wire 22 is reversely bent to define an integral, inwardly-extending extension 34 which cooperates with the end portion of leg 32 to define a generally V-shaped opening that opens towards the bight portion 30. A generally L-shaped structure 36 is integral with the end of inwardly-extending extension 34.

The second wire 24 is also bent to a specific configuration to be rigidly supported on base wire 22 for supporting an elongated article on base 22. The second wire is bent intermediate opposite ends into two generally semi-circular portions 40 that are integrally joined at 42. The generally arcuate recesses 40 define cradles for the articles to be supported. The bight portion consisting of arcuate portions 40 has a pair of generally parallel legs 44 extending from opposite ends thereof which terminate adjacent the base into inwardly-directed portions 46. Each inwardly-directed portion 46 also has an upwardly-extended projection 48 integral with the free end thereof which defines an article-piercing projection that is generally aligned with the center of the arcuate recess 40 spaced above the base. As illustrated in FIG. 3, the support structure or member 24 is tilted at a slight angle with respect to a vertical plane and is secured onto the legs 32, as well as inwardly-directed projections 34, by suitable securing means, such as spot welding. Thus, each inwardly-directed portion of the support structure has multi-point contact with the base to provide a more stable unit.

In use of the article on a cooking surface 18, the user need only insert the free ends of the L-shaped legs 36 between a pair of spaced rods and allow the weight of the rack to force the remainder of the base into engagement with the cooking surface 16. The L-shaped legs 36 will thus secure the rack 12 on the cooking surface 16, as illustrated in FIG. 1.

As can be appreciated from the above description, The rack of the present invention is ideally suited for use on any area of the cooking surface and occupies a minimum amount of space. The rack or a number of racks of the type disclosed in the specific embodiment may be utilized to position any number of elongated articles on various different portions of the cooking surface. Utilizing the wire construction shown herein, minimizes the obstruction of the rack from heat coming into direct contact with the article that is being cooked.

Numerous other advantages over the prior art large circular-type rack structures presently being marketed are apparent. The rack is compact in nature, can be easily packaged and occupies a minimum amount of space during storage and display. Since the only components of the rack are two small diameter wires which are very inexpensive, the cost of the unit is minimal. Furthermore, the design of the unit is such that it has the capability of supporting a pair of article is of significant advantage to most families. Most families are structured to be multiples of two so that, for example, a husband and wife without children would need only one such rack, whereas a family of four could utilize two racks for most of its cooking needs.

As can be appreciated from the above description, the present invention provides an inexpensive, simplified, small and compact portable rack that can easily be mounted on a cooking surface and removed therefrom. The location of the rack on the cooking surface is not in any way restricted and occupies very little space of the entire cooking surface. Of course, the particular configurations of the base structure, as well as the support structure, could be modified somewhat without departing from the spirit of the invention.

For example, the base 22 need not have the generally rectangular configuration illustrated, but could easily be formed into other configurations such as a V-shaped configuration. Also, the angle of tilt between the support structure 24 and the base 22 could easily be modified.

I claim:

1. A wire rack for the retention of an article on a cooking grill defined by spaced rods comprising a wire base having spaced, generally L-shaped portions adapted to extend between adjacent rods and under one of the rods to support said base on said cooking grill, an upwardly-inclined wire support structure having at least one arcuate portion at the upper end defining a cradle for said article and an upwardly-directed projection on a lower end of said support structure for supporting a lower end of said article.

2. A wire rack as defined in claim 1, in which said base includes a wire bent to a generally U-shaped configuration having a bight portion and a pair of legs extending from said bight portion with said L-shaped portions on respective ends of said pair of legs.

3. A wire rack as defined in claim 2, in which said pair of legs each have an inward extension between the leg and the L-shaped portions cooperating with the leg to define a generally V-shaped configuration opening toward said bight portion.

4. A wire rack as defined in claim 3, in which said support structure consists of a single wire bent to a generally inverted U-shaped configuration having a bight portion defining two generally arcuate recesses and two generally parallel legs extending toward said base with inwardly-directed integral portions supported on said legs and extensions of said base, and in which there are upwardly-directed projections on the inner ends of each of said inwardly-directed extensions.

5. A wire rack as defined in claim 1, in which said wire support structure consists of a single wire bent intermediate opposite ends to define at least two arcuate portions defining two cradles spaced from said base and two legs extending from opposite sides of respective cradles to said base, each having generally horizontal integral portions supported on said base and in which a free end of each horizontal portion has an integral upwardly-directed projection.

6. A wire rack as defined in claim 5, in which said support structure is tilted with respect to a vertical plane.

7. A wire rack as defined in claim 5, in which said upwardly-directed projections are generally aligned with centers of respective cradles.

8. A wire rack for retention of a plurality of articles on a cooking surface defined by spaced rods comrising a base consisting of a first wire bent to a generally U-shaped configuration having spaced, generally parallel legs and generally L-shaped, downwardly-offset ends adapted to be received between and under adjacent rods of said cooking surface; and an upright support consisting of a second wire bent to a generally U-shaped configuration having a bight portion and two substantially parallel legs, said bight portion being bent to define at least two generally arcuate recesses defining upper supports for said articles, each of said legs having integral, inwardly-directed portions respectively supported adjacent the free ends of the legs of said first wire and upwardly-directed projections terminating in free ends defining piercing projections for piercing said articles so that said articles are supported at a lower end on said piercing projections and are adapted to be received and supported adjacent an upper end in said recesses.

9. A wire rack as defined in claim 8, further including an extension between each leg and L-shaped end to provide multipoint contact between said inwardly-directed portions of said upright support and said base.

10. A wire rack as defined in claim 8, in which said upright support is tilted with respect to a vertical reference plane.

11. A rack for use with a grill having a cooking surface defined by spaced rods comprising a base adapted to be supported on said rods and having projections adapted to extend below said rods, a support member extending above said base and adapted to receive an article to be cooked, said support member including an inclined cradle structure extending above said base and having a recess above said support member for receiving and supporting said article.

* * * * *